Figure 3:
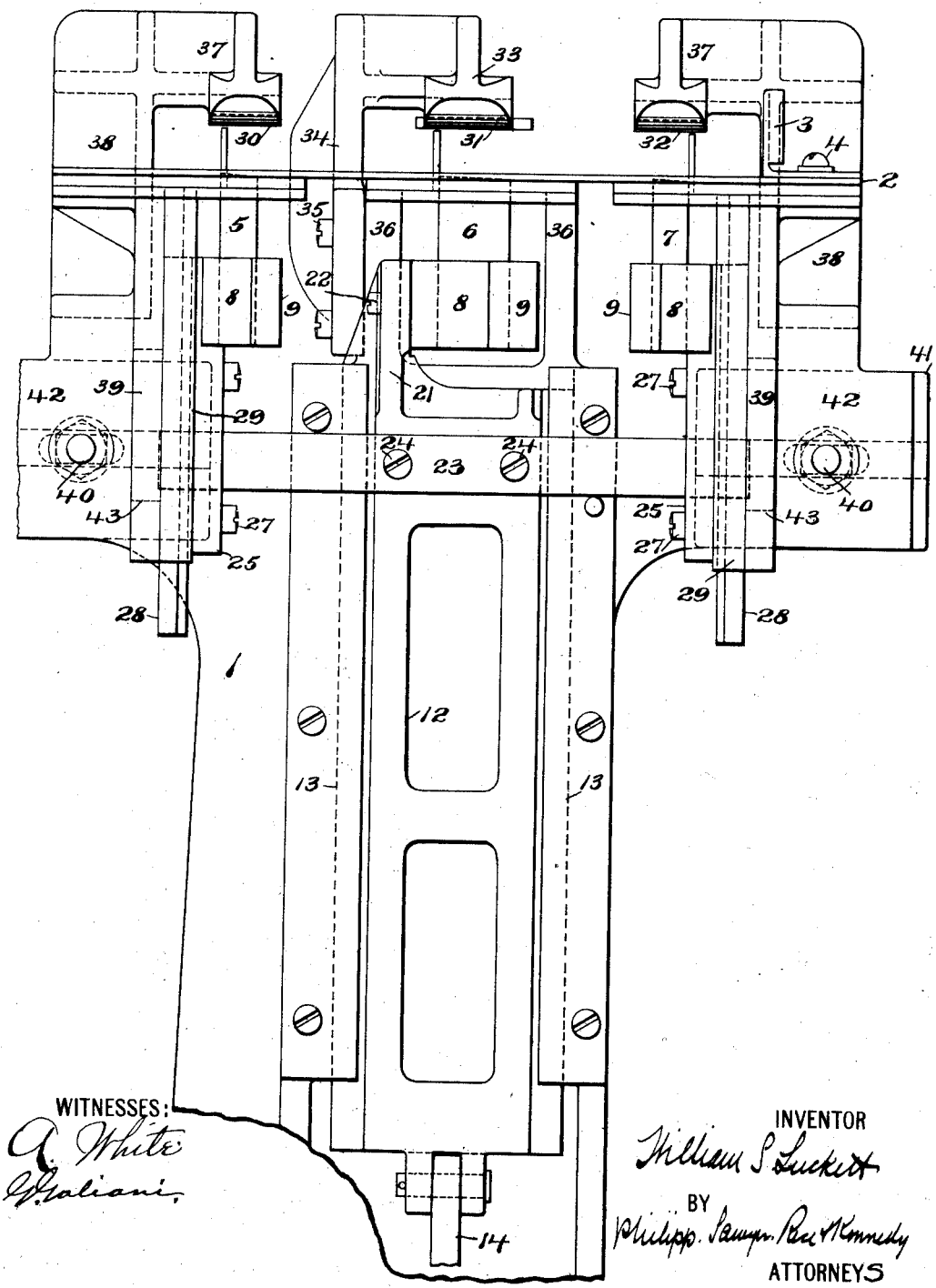

No. 864,661. PATENTED AUG. 27, 1907.
W. S. LUCKETT.
CUTTING MECHANISM.
APPLICATION FILED OCT. 31, 1904. RENEWED JULY 3, 1907.
4 SHEETS—SHEET 1.
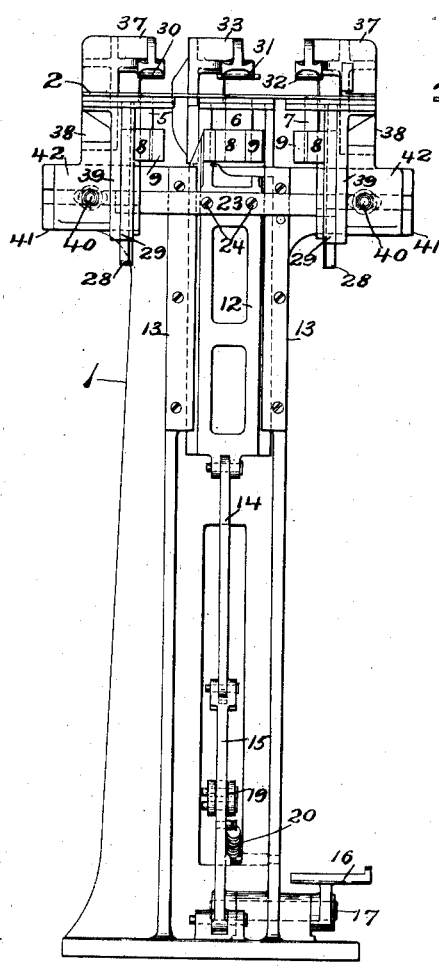
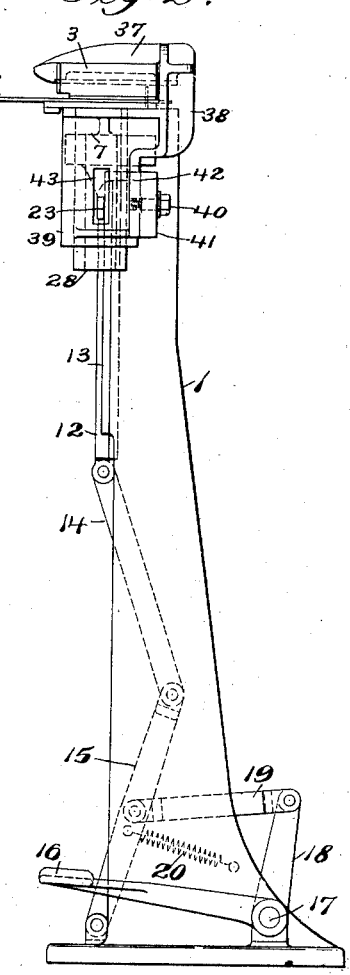
WITNESSES:
INVENTOR
BY
ATTORNEYS No. 864,661. PATENTED AUG. 27, 1907.
W. S. LUCKETT.
CUTTING MECHANISM.
APPLICATION FILED OCT. 31, 1904. RENEWED JULY 3, 1907.

4 SHEETS—SHEET 2.

WITNESSES:

INVENTOR
William S. Luckett
BY
Philipp, Sawyer, Rice & Kennedy
ATTORNEYS

No. 864,661. PATENTED AUG. 27, 1907.
W. S. LUCKETT.
CUTTING MECHANISM.
APPLICATION FILED OCT. 31, 1904. RENEWED JULY 3, 1907.

4 SHEETS—SHEET 3.

No. 864,661.

PATENTED AUG. 27, 1907.

W. S. LUCKETT.
CUTTING MECHANISM.
APPLICATION FILED OCT. 31, 1904. RENEWED JULY 3, 1907.

4 SHEETS—SHEET 4.

WITNESSES:
A. White
J. Italiani.

INVENTOR
William S. Luckett
BY
Philipp, Sawyer, Rice & Kennedy
ATTORNEYS

UNITED STATES PATENT OFFICE.

WILLIAM S. LUCKETT, OF EAST ORANGE, NEW JERSEY, ASSIGNOR TO INTERNATIONAL CIGAR MACHINERY COMPANY, OF NEW YORK, N. Y., A CORPORATION OF NEW JERSEY.

CUTTING MECHANISM.

No. 864,661.                  Specification of Letters Patent.           Patented Aug. 27, 1907.

Application filed October 31, 1904, Serial No. 230,641. Renewed July 3, 1907. Serial No. 382,076.

To all whom it may concern:

Be it known that I, WILLIAM S. LUCKETT, a citizen of the United States, residing at East Orange, county of Essex, and State of New Jersey, have invented certain new and useful Improvements in Cutting Mechanisms, fully described and represented in the following specification and the accompanying drawings, forming a part of the same.

This invention relates to certain improvements in cutting mechanism for forming filler material for cigars.

In making cigars by machinery, and particularly the better grades of cigars, it has been proposed to prepare a mass of filler equal in width to the length of the cigar to be formed, the mass being notched or cut out on opposite edges to provide for the shaping of the cigar to be formed, and the size, shape and relative location of the notches varying according to the particular cigar to be produced. From this mass of filler, individual fillers were cut or separated in any desired way, these fillers being incased in binders by a rolling mechanism of any suitable type.

Various cutting mechanisms have been suggested for forming this filler mass with notched edges. These cutting mechanisms have, however, had in view the production of the mass of filler material by a series of uniform cuts made from a layer of tobacco leaves. In some cases it was proposed to use a pair of knives, one knife being of proper configuration to shape the edge of the mass which corresponds to the tuck end of the cigar or bunch and the other being of proper configuration to shape the edge of the mass which corresponds to the head end of the cigar or bunch. Other mechanisms have contemplated the use of a single knife, it being attempted to so shape this knife that a single cut made thereby would properly shape what may be termed the tuck edge of a section which afterwards went into the mass of filler material, and also the head edge of the next succeeding section.

Whatever the shape or number of knives employed, however, the tobacco leaves were arranged in a layer, special care being taken to arrange the leaves so that they overlapped, the idea being to make a uniform layer of substantially the same thickness as the mass which was thereafter formed, this mass being formed by placing the cuts or sections one after another in a channel from which they were fed to a separating mechanism which separated the individual amounts of bunch material therefrom. Furthermore, the cuts made from this layer of overlapping leaves by the cutting mechanism were always of uniform length. The result of this was that there was no certainty that successive sections would contain leaf sections which were uniform in length. In other words, one section might contain all long filler, that is filler extending from end to end of the bunch or cigar to be formed from the mass of filler material, another section might contain both long and short filler, the proportions of these two kinds of filler varying widely in different cuts, and another section might contain nothing but short filler. The cigar bunches formed from this filler material would, therefore, not be uniform as respects the filler. Furthermore, it was difficult and practically impossible with these devices to produce sections which were uniform in thickness, because of the difficulty in making uniform layers for the knives to work upon. These proposed cutting mechanisms have, therefore, not gone into extensive use, and such use as they have had has been confined to the making of the cheapest grades of cigars.

The present invention has for one of its objects to produce an improved filler cutting mechanism by which uniform filler material may be produced, so that bunches formed therefrom will be substantially uniform.

A further object of the invention is to produce an improved cutting mechanism for forming filler material which is adapted to cut from a group of leaves a mass of filler section of the length of the bunch to be formed and one or more forming sections which sections are thereafter assembled to form filler material.

A further object of the invention is to provide an improved cutting mechanism for cigar fillers which shall embody certain details of construction by which the operation of the mechanism as a whole is improved.

Figure 4:
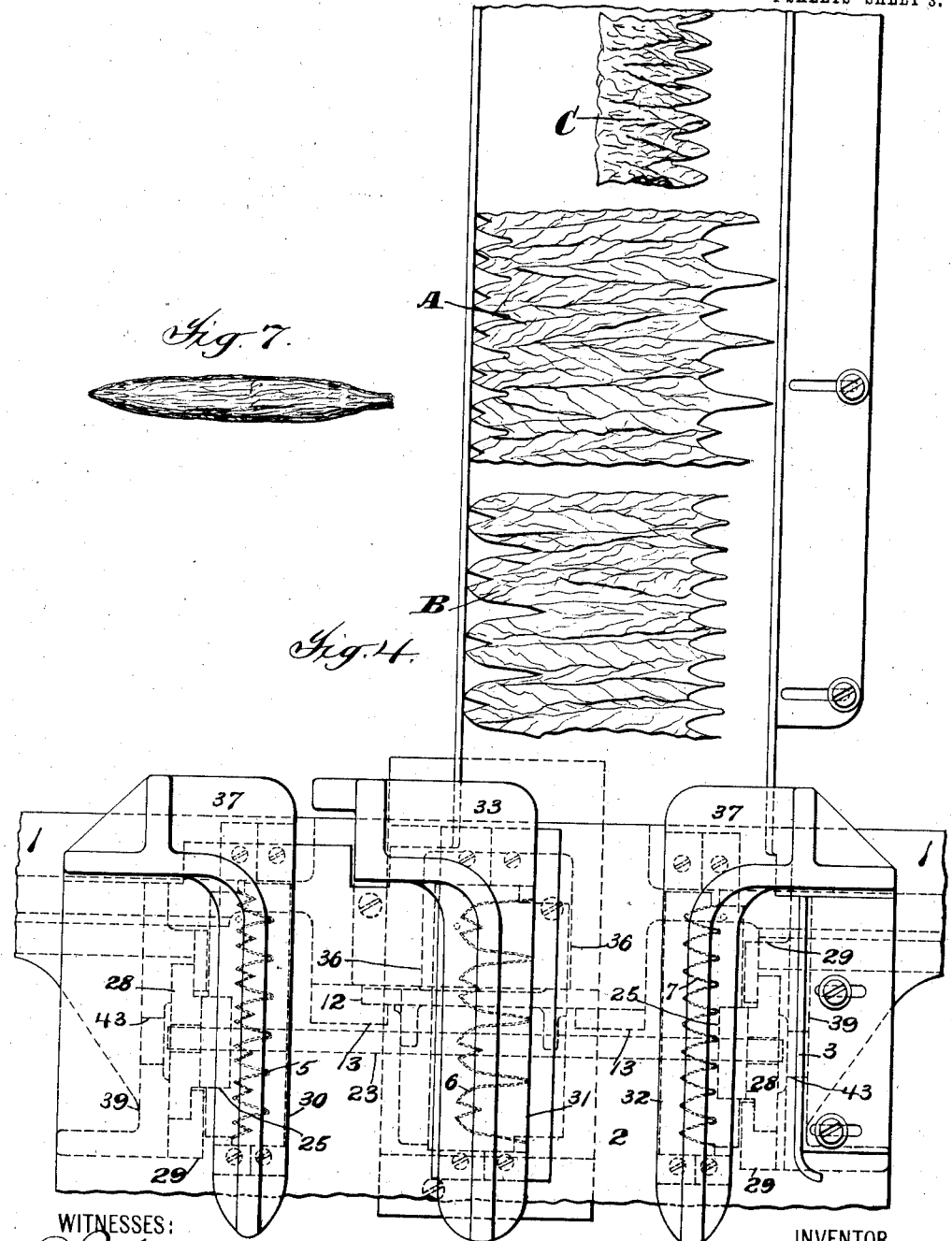
Figure 5:
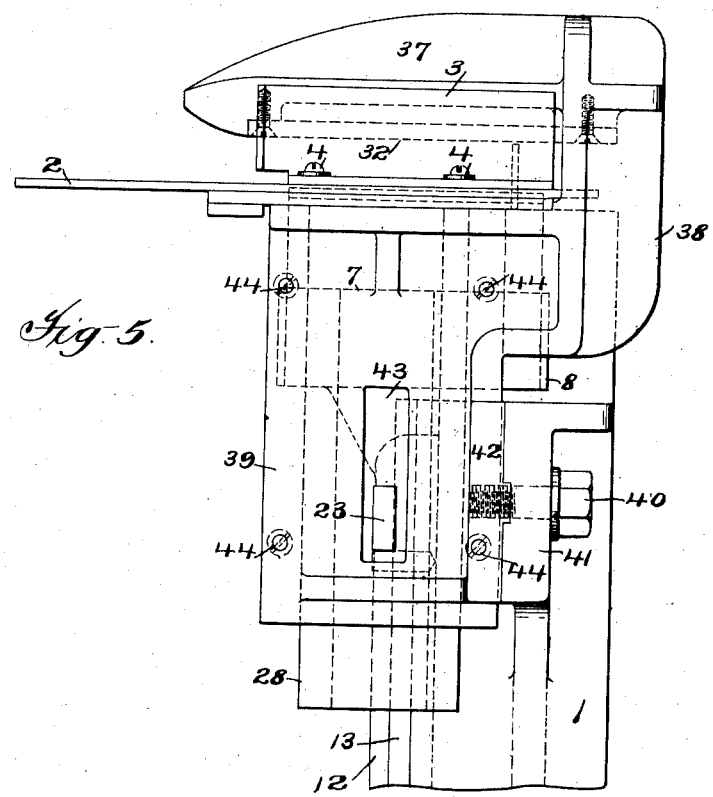
Figure 6:
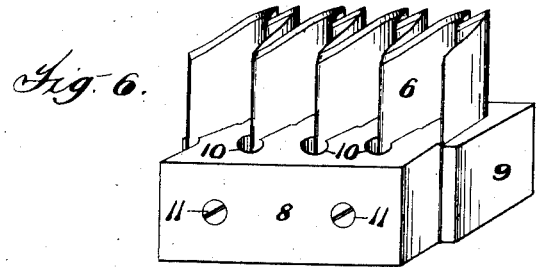

Referring to the drawings—Figure 1 illustrates in front elevation a form of cutting mechanism embodying the invention. Fig. 2 is a side elevation of the construction shown in Fig. 1. Fig. 3 is a front elevation, on an enlarged scale, of the upper end of the construction illustrated in Fig. 1. Fig. 4 is a plan view on an enlarged scale of the construction shown in Fig. 1. Fig. 5 is a side elevation, on an enlarged scale, of the upper end of the construction shown in Fig. 2. Fig. 6 is a detail view of one of the cutters. Fig. 7 is a diagrammatic view of the cigar bunch.

The particular mechanism which has been selected to illustrate the invention is a mechanism adapted to produce filler material for cigars of what is known as the "perfecto shape", this being substantially the shape illustrated in Fig. 7 of the drawings. Any machine embodying the invention will, of course, have its working parts mounted in a suitable frame. In the construction shown, the frame is in the form of a standard or support, marked 1. The mechanism further embodies a supporting table 2 on which the tobacco leaves to be cut are arranged.

It may be here remarked that in operating the mechanism to be hereinafter described, the tobacco is not arranged in the form of a stream or layer, as in the mechanisms heretofore used in the art, but a group of tobacco leaves is selected by the operator, these leaves being graded according to the size of the cigar to be made, so that the cuts hereinafter described may be economically produced, that is, produced without the formation of an undue amount of what is ordinarily termed in the trade "shorts."

In operating the mechanism, the operator first groups together a number of leaves, arranging the leaves so that their tips point in the same direction. The best results will be produced in making the "perfecto" cigars at least, if the several leaves be brought into substantial register at their tip ends, although this is not absolutely necessary. In the best constructions, a gage will be provided by which the group of leaves may be positioned. While this gage may be of any desired construction, as shown, it consists of a plate 3 adjustably secured to the table 2 in any suitable manner, as by screws 4. The group of leaves, having been arranged as described, are laid on the table 2 and positioned by means of the gage 3, the tips of the longest leaves being brought against it, after which they are ready for the action of the cutting devices.

The cutting devices may be varied widely in construction, in number and in relative arrangement, and will vary according to the kind or style of cigar to be produced. The cutting devices, however, will include means for severing from the group of filler leaves a section which is equal in length to the cigar to be formed. In the particular construction shown, the cutting devices include shaping knives, three such knives being shown, and being marked 5, 6 and 7. The knives will, in the best constructions, be arranged so as to notch the edges of the filler, this being effected by forming the knives so that their edges present salient and reëntrant angles, as clearly indicated in Figs. 4 and 6. The particular configuration which is given to the knives, that is to say, the particular relation of the salient and reëntrant portions to each other and their extent, will depend upon the particular type of cigar to be produced.

The knives, whatever be the number employed, may be mounted and operated in any desired manner. As shown (see Fig. 6), a two-part block is provided, one of the parts being marked 8 and the other 9. The part 8 has recesses, as 10, formed therein, into which the salient angles of the knives project and the knives are held in position by the block 9, the overlapping ends of said block embracing the block 8, as clearly indicated in Fig. 6. The two parts of the block may be secured together in any desired way, as, for instance, by screws 11. The knives may be located above or below the leaf supporting table of the machine, but in the best constructions, they will be located below, for reasons which will be hereinafter stated.

The operating means for the knives may be varied widely. As shown, there is provided a slide 12 arranged to run in ways 13 mounted on the front of the standard 1, this slide, in the particular construction shown, being operated by means of a pair of toggle links 14, 15, the toggle being made by a treadle 16 mounted on a shaft 17, said shaft having an arm 18 which is connected by a link 19 to the link 15. The toggle is broken by means of a spring 20 secured to the link 15. The slide is provided on its upper end with a bracket 21 to which the knife holding block that carries the knife 6 is secured in any suitable manner, as, for instance, by screws, one of which is indicated at 22. In the particular construction shown, a single slide operates all the knives. While this may be accomplished in any desired manner, as illustrated, the slide 12 carries a cross bar 23, this bar being secured to the slide by means of screws 24, or in any other suitable manner. This bar extends on each side through openings in blocks 25, these blocks being secured by screws 27, or in any other suitable manner, to slides 28 which work in ways 29. The two-part blocks 8, 9 which carry the knives 5 and 7 may be secured to the blocks 25 in any suitable manner. In the construction shown, the blocks 25 are made integral with the part 8 of the two part block 8, 9.

Suitable coöperating devices are employed in connection with the cutters which devices may be of any suitable description. In the construction shown, female dies 30, 31 and 32 coöperate with the cutters 5, 6 and 7 respectively. These dies may be mounted in any suitable manner. As shown, the die 31 is formed on the under side of an overhanging arm 33, this arm being integral with a standard 34, which is secured by means of screws 35, or in any other suitable manner, to an upright 36 which forms a part of the standard 1. The dies 30 and 32 are carried on overhanging arms 37 which extend from standards 38, these standards being formed integral with side plates 39 secured by bolts 40, or in any other suitable manner, to brackets 41 extending from the main frame 1, the plates 39 being provided with ribs 42 through which the screws 40 pass. These side plates 39 have openings 43 therein to permit the movement of the cross bar 23 before referred to. The ways 29 which are the ways in which the slide 28 moves, are fast to the side plates 39, being secured thereto by screws 44, or in any other suitable manner.

While the arrangement of knives and coöperating dies which has just been described is not essential to the invention, it presents many advantageous features, and the best constructions will embody it. Among other results secured by this arrangement of knives and dies, it may be remarked that the knives clear themselves after each cutting operation. It is to be understood, of course, that the table 2 has apertures through which the knives work and as the knives pass out through these apertures, they carry the group of tobacco leaves upward somewhat until the leaves are compacted against the dies. A further movement of the knives severs the leaves, and after this severing operation is completed, as the knives pass downward, they draw out of the cut leaves which are all left on the top of the table. This arrangement, therefore, does away with any clearing device for getting portions of the cut leaves out from between the cutters, which devices are practically necessary when the knives are located above the dies and work downward into them.

In the particular construction illustrated, it has been before stated that no matter what the number of knives employed may be or how they may be otherwise arranged, they will always be arranged so that one cut of filler material will be produced which is equal in length to the cigar to be formed from the filler material. In the particular construction illustrated, this section, which may be conveniently termed the "main section" is produced by the knives 5 and 6 and is marked A in Fig. 4.

The particular mechanism illustrated cuts, in addition to the main section A, other sections which may be conveniently termed "forming sections." One of these sections is marked B, and the other C (see Fig. 4). These sections are shown as separated in Fig. 4, for the purpose of clearly illustrating the action of the cutters. After each group of leaves has been cut, the cuts will be assembled to form a mass of filler material. This assembling may be conveniently effected by superposing the several cuts, the cut B being placed on the cut A and the cut C on the cut B. As fast as the groups of leaves are cut, the assembled cuts may be put together to form a mass of filler material which may be either stored in some convenient receptacle, or, as will usually be the case, fed within the range of action of suitable separating devices to sever the mass from edge to edge into sections each of which is suitable for a cigar filler, this filler being converted into a bunch by incasing it in a suitable binder.

When a mechanism such as that shown in the drawings is employed, there will be some tobacco remaining, this tobacco consisting of the butt ends of the leaves which project beyond the knives 5. If the leaves be properly selected and graded with respect to the cigars it is proposed to make, this tobacco may be distributed through the mass of filler formed by assembling the sections without affecting the shape of the cigar. If, however, any considerable amount of tobacco remains, it may be assembled with other leaves from which sections are to be cut in the manner described, or this remaining tobacco may be utilized as shorts or scrap.

It will be readily understood that inasmuch as each group of leaves has one main section cut therefrom which is equal to the length of a cigar, each filler severed from the mass of which this section forms a part will also have a certain amount of filler material or leaves extending from end to end of the cigar. Furthermore, by properly shaping the knives and arranging them so as to cut the main section and a suitable number of forming sections, any desired shape of cigar can be produced.

The particular construction illustrated in the drawings is an excellent one for the formation of cigars of a perfecto shape. The invention is not, however, confined to constructions which will make perfecto shapes of cigars, but may be embodied in constructions for forming the filler material for cigars of other shapes. The invention is not, therefore, to be limited to the particular contruction herein described and shown.

What is claimed is:—

1. In a filler cutter, the combination with means for cutting a main filler section, of means for cutting an additional forming section to be assembled with the main section, and a common operating means for both cutting means, substantially as described.

2. In a filler cutter, the combination with means for cutting a main filler section, said means operating to shape the ends of said section so that they contain less material than the intermediate parts thereof, of means for cutting a forming section to be assembled with the main section, and a common operating means for both cutting means, substantially as described.

3. In a filler cutter, the combination with means for cutting a main filler section, said means operating to shape the ends so that they contain less material than the intermediate parts thereof, of means for cutting a forming section, said means operating to shape the ends of the forming section so that they will contain less material than the intermediate parts, and a common operating means for both cutting means, substantially as described.

4. In a filler cutter, the combination with a cutter adapted to cut one end of a main filler section and one end of a forming section, said cutter shaping said ends so that they contain less material than the intermediate parts of said sections, of length determining cutters for cutting the other ends of said sections, substantially as described.

5. In a filler cutter, the combination with a cutter adapted to cut one end of a main filler section and one end of a forming section, said cutter shaping said ends so that they contain less material than the intermediate parts of said sections, of length determining cutters for cutting the other ends of said sections, and means for simultaneously operating the cutters, substantially as described.

6. In a filler cutter, the combination with a cutter adapted to cut one end of a main filler section and one end of a forming section, said cutter shaping said ends so that they contain less material than the intermediate parts of said sections, of length determining cutters, said cutters operating to shape the other ends of said sections so that they will contain less material than the intermediate parts of said sections, substantially as described.

7. In a filler cutter, the combination with a cutter adapted to cut one end of a main filler section and one end of a forming section, said cutter shaping said ends so that they contain less material than the intermediate parts of said sections, of length determining cutters, said cutters operating to shape the other ends of said sections so that they will contain less material than the intermediate parts of said sections, and means for simultaneously operating the cutters, substantially as described.

8. In a filler cutter, the combination with a cutter the edge of which is arranged to present salient and reëntrant angles, said cutter operating to form one end of a main filler section and one end of a forming section, of cutters for determining the length of said sections, one of said cutters having its edge arranged to form salient and reentrant angles, substantially as described.

9. In a filler cutter, the combination with a cutter the edge of which is arranged to present salient and reëntrant angles, said cutter operating to form one end of a main filler section and one end of a forming section, of cutters for determining the length of said sections, one of said cutters having its edge arranged to form salient and reentrant angles, and means for simultaneously operating the cutters, substantially as described.

10. In a filler cutter, the combination with a cutter the edge of which is arranged to present salient and reëntrant angles, said cutter operating to form one end of a main filler section and one end of a forming section, of cutters for determining the length of said sections lying on each side of said cutter, said length determining cutters having their edges arranged to present salient and reëntrant angles, substantially as described.

11. In a filler cutter, the combination with a cutter the edge of which is arranged to present salient and reëntrant angles, said cutter operating to form one end of a main filler section and one end of a forming section, of cutters for determining the length of said sections lying on each side of said cutter, said length determining cutters having their edges arranged to present salient and reëntrant angles, and means for simultaneously operating the cutters, substantially as described.

12. In a filler cutter, the combination with a pair of length determining cutters for severing main and forming sections of filler, of an intermediate cutter operating to form one end of the main filler section and one end of the forming section, the distance between the intermediate cutter and the length determining cutter for the main section being greater than the distance between the intermediate cutter and the length determining cutter for the forming section, whereby the forming section is made shorter than the main section, substantially as described.

13. In a filler cutter, the combination with a pair of length determining cutters for main and forming sections of filler, the edges of said cutters presenting salient and reëntrant angles, of an intermediate cutter operating to form one end of the main filler section and one end of the forming section, the edges of said cutter presenting salient and reëntrant angles, the distance between the intermediate cutter and the length determining cutter for the main section being greater than the distance between the intermediate cutter and the length determining cutter for the forming section, whereby the forming section is made shorter than the main section, substantially as described.

14. In a filler cutter, the combination with a support, of a gage for positioning one end of a group of leaves, and means for severing the leaves into a plurality of sections, one of which is equal in length to the cigar to be formed and another of which is less in length than the cigar to be formed, substantially as described.

15. In a filler cutter, the combination with a support, of a gage for positioning one end of a group of leaves, and cutters for severing the leaves into a plurality of sections, one of which is equal in length to the cigar to be formed and another of which is less in length than the cigar to be formed, the edges of the cutters being arranged to present salient and reëntrant angles, substantially as described.

16. In a filler cutter, the combination with a support, of a gage for positioning one end of a group of leaves, and means for simultaneously severing the leaves into a plurality of sections, one of which sections is equal in length to the cigar to be formed and another of which is less in length than the cigar to be formed, substantially as described.

17. In a filler cutter, the combination with a support, of a gage for positioning one end of a group of leaves, and cutters, the edges of which present salient and reëntrant angles, for simultaneously severing the leaves into a plurality of sections, one of which sections is equal in length to the cigar to be formed and another of which is less in length than the cigar to be formed, substantially as described.

18. In a filler cutter, the combination with a support for a group of leaves, of an intermediate cutter and two outer cutters, the distance between the intermediate and one outer cutter being equal in length to the cigar to be formed, and the distance between the intermediate cutter and the other outer cutter being less than the length of the cigar to be formed, substantially as described.

19. In a filler cutter, the combination with a support for a group of leaves, of an intermediate cutter and two outer cutters, the edges of said intermediate and outer cutters presenting salient and reëntrant angles, the distance between the intermediate cutter and one outer cutter being equal in length to the cigar to be formed, and the distance between the intermediate cutter and the other outer cutter being less than the length of the cigar to be formed, substantially as described.

20. In a filler cutter, the combination with a support, of a gage for positioning one end of a group of leaves, three cutters lying on one side of the gage, the distance from the intermediate cutter to the cutter which is farthest from the gage being equal in length to the cigar to be formed, and the distance from the gage to the cutter next it being less in length than the cigar to be formed, substantially as described.

21. In a filler cutter, the combination with a support, of a gage for positioning one end of a group of leaves, three cutters lying on one side of the gage, the edges of said cutters presenting salient and reëntrant angles, the distance from the intermediate cutter to the cutter which is farthest from the gage being equal in length to the cigar to be formed, and the distance from the gage to the cutter next it being less in length than the cigar to be formed, substantially as described.

22. In a filler cutter, the combination with a support, of a plurality of cutting knives located below the support, said support having apertures through which the knives pass, coöperating cutting means located above the support, and means for operating the knives, substantially as described.

23. In a filler cutter, the combination with a support, of a plurality of male cutting knives located below the support, said knives having their edges arranged to present salient and reëntrant angles, and the support having apertures through which the knives pass, a plurality of female cutters located above the support coöperating with the male knives, and means for operating the male knives, substantially as described.

24. In a filler cutter, the combination with a support having a gage for positioning one end of a group of leaves, of a plurality of cutting knives located below the support, said support having apertures through which the knives pass, coöperating cutting means located above the support, and means for operating the knives, substantially as described.

25. In a filler cutter, the combination with a support having a gage for positioning one end of a group of leaves, of a plurality of male cutting knives located below the support, said knives having their edges arranged to present salient and reëntrant angles, and the support having apertures through which the knives pass, a plurality of female cutters located above the support coöperating with the male knives, and means for operating the male knives, substantially as described.

In testimony whereof, I have hereunto set my hand, in the presence of two subscribing witnesses.

WILLIAM S. LUCKETT.

Witnesses:
A. WHITE,
W. H. KENNEDY.